United States Patent
Makita (10) Patent No.: US 8,112,583 B2
(45) Date of Patent: Feb. 7, 2012

(54) DATA RECORDING FOR A HARD DRIVE IN RESPONSE TO COMMANDS

(75) Inventor: Takeshi Makita, Kanagawa (JP)

(73) Assignee: Sony Corporation, Tokyo (JP)

( * ) Notice: Subject to any disclaimer, the term of this patent is extended or adjusted under 35 U.S.C. 154(b) by 614 days.

(21) Appl. No.: 12/263,593

(22) Filed: Nov. 3, 2008

(65) Prior Publication Data

US 2009/0125681 A1    May 14, 2009

(30) Foreign Application Priority Data

Nov. 9, 2007  (JP) ................................. 2007-292495

(51) Int. Cl.
   *G06F 12/02*  (2006.01)
(52) U.S. Cl. ................. 711/114; 711/154; 711/E12.019
(58) Field of Classification Search .......................... None
   See application file for complete search history.

(56) References Cited

U.S. PATENT DOCUMENTS

| 7,493,456 B2 * | 2/2009 | Brittain et al. ................. 711/154 |
| 2008/0091881 A1 * | 4/2008 | Brittain et al. ................. 711/125 |

FOREIGN PATENT DOCUMENTS

| JP | 09-128291 A | 5/1997 |
| JP | 200-039968 A | 2/2000 |
| JP | 2000-076021 A | 3/2000 |
| JP | 2003-345514 A | 12/2003 |
| JP | 2005-071427 A | 3/2005 |
| JP | 2006-251844 A | 9/2006 |

* cited by examiner

*Primary Examiner* — Reginald Bragdon
*Assistant Examiner* — Eric Loonan
(74) *Attorney, Agent, or Firm* — Wolf, Greenfield & Sacks, P.C.

(57) ABSTRACT

A data recording apparatus that writes data on/reads data from a hard disk drive in response to a data-write/read command received from an upper control device is provided. The data recording apparatus includes a command-aggregating device and a command-issuing device. The command-aggregating device is configured to generate an aggregate command by aggregating contents of a plurality of commands under the conditions that the plurality of commands are of the same kind continuously received from the control device and logical block addresses designated by the plurality of commands are consecutive addresses. The command-issuing device is configured to issue the aggregate command generated by aggregating the plurality of commands to a hard disk drive controller that controls the hard disk drive.

12 Claims, 7 Drawing Sheets

T = 1 SECOND
SMAX = 100

| TIME | COMMAND | LBA | LEN | |
|---|---|---|---|---|
| 10:00:00.100 | WRITE | 1000 | 10 | ⎫ |
| 10:00:00.110 | WRITE | 1010 | 10 | ⎬ |
| 10:00:00.120 | WRITE | 1020 | 10 | |
| 10:00:00.130 | WRITE | 1030 | 10 | |
| 10:00:00.140 | WRITE | 1040 | 10 | AGGREGATED TO |
| 10:00:00.150 | WRITE | 1050 | 10 | "WRITE LBA 1000 LEN 100" |
| 10:00:00.160 | WRITE | 1060 | 10 | |
| 10:00:00.170 | WRITE | 1070 | 10 | |
| 10:00:00.180 | WRITE | 1080 | 10 | |
| 10:00:00.190 | WRITE | 1090 | 10 | ⎭ |
| 10:00:00.200 | WRITE | 1100 | 10 | |

FIG. 9

T = 1 SECOND
SMAX = 100

| TIME | COMMAND | LBA | LEN | |
|---|---|---|---|---|
| 10:00:00.100 | WRITE | 1000 | 10 | ⎫ |
| 10:00:00.110 | WRITE | 1010 | 10 | ⎬ AGGREGATED TO |
| 10:00:00.120 | WRITE | 1020 | 10 | "WRITE LBA 1000 LEN 50" |
| 10:00:00.130 | WRITE | 1030 | 10 | |
| 10:00:00.140 | WRITE | 1040 | 10 | ⎭ |
| 10:00:05.100 | WRITE | 1050 | 10 | |
| 10:00:05.110 | WRITE | 1060 | 10 | |
| 10:00:05.120 | WRITE | 1070 | 10 | |
| 10:00:05.130 | WRITE | 1080 | 10 | |

FIG. 10

T = 1 SECOND
SMAX = 100

REQUEST FROM
PERSONAL COMPUTER 4

| TIME | COMMAND | LBA | LEN |
|---|---|---|---|
| 10:00:00.000 | WRITE | 1000 | 200 |

COMMANDS FROM
UPPER CONTROL PART 11-1

| TIME | COMMAND | LBA | LEN | |
|---|---|---|---|---|
| 10:00:00.010 | WRITE | 1000 | 10 | ⎫ |
| 10:00:00.020 | WRITE | 1010 | 10 | ⎬ AGGREGATED TO "WRITE LBA 1000 LEN 100" |
| 10:00:00.030 | WRITE | 1020 | 10 | |
| ...... | ...... | ...... | ...... | ⎭ |
| 10:00:00.100 | WRITE | 1090 | 10 | |
| 10:00:00.110 | WRITE | 1100 | 10 | ⎫ |
| ...... | ...... | ...... | ...... | ⎬ AGGREGATED TO "WRITE LBA 1100 LEN 100" |
| 10:00:00.200 | WRITE | 1190 | 10 | ⎭ |

DATA RECORDING FOR A HARD DRIVE IN RESPONSE TO COMMANDS

CROSS REFERENCES TO RELATED APPLICATIONS

The present invention contains subject matter related to Japanese patent application JP 2007-292495 filed in the Japanese Patent Office on Nov. 9, 2007, the entire contents of which being incorporated herein by reference.

BACKGROUND OF THE INVENTION

1. Field of the Invention

The present invention relates to a data recording apparatus writing data on/reading data from a hard disk drive in response to a command received from an upper control device.

2. Description of the Related Art

Apparatuses with redundant array of inexpensive disks (RAID), or RAID apparatuses, are those in which a RAID technology is used to record AV data (i.e., video data and audio data) on a plurality of hard disk drives. Such RAID apparatuses have been widely used as data recording apparatuses for business and professional purposes. In general, such RAID apparatuses carry out write/read operations of AV data in response to commands transmitted from upper control devices.

Hard disk drives have restrictions on access time (i.e., time before actually carrying out a data-write/read operation after receiving a data-write/read command) due to seek time of a head or rotational delay of a target sector.

Therefore, a system continuously reproducing AV data without interruption has been designed to use a specific format to appropriately arrange AV data on hard disks in a RAID apparatus, thereby assuring a high data rate at the time of reading/writing operation (see, for example, Japanese Unexamined patent application Publication No. 2000-076021).

SUMMARY OF THE INVENTION

Specific formats may not be used for hard disks in a RAID apparatus when AV data is written on or read from the RAID apparatus using application software running on a universal OS (e.g., when the AV data is written on or read from the RAID apparatus by operating a personal computer). In this case, the hard disks may be managed using a universal file system with a universal OS to allow the hard disks to be more easily handled with application software.

However, the management of the hard disks in the RAID apparatus using the universal file system leads to segmentation of a request for writing/reading AV data with a large data size through the application software into commands with small data sizes because of a small memory unit being managed by the universal OS. These small commands are then transmitted to a control part that carries out the internal control of the RAID apparatus.

For executing one received command, the control part carrying out the internal control of the RAID apparatus issues commands for the respective hard disk drives in the RAID apparatus. Thus, if a large number of commands with small data sizes are consecutively received, then commands for the respective hard disk drives may be issued up to the number obtained by multiplying the number of the received commands by the number of the hard disk drives. As a result, the control part shows a considerable amount of overhead.

In this way, the more the overhead of the control part increases, the more the throughput of reading/writing AV data in the RAID apparatus decreases.

It is desirable to reduce the overhead of a control part. The control part carries out the internal control of a data recording apparatus writing data on/reading data from a hard disk drive in response to a data-write/read command received from an upper control device when the hard disk in such an apparatus is managed using a universal file system.

According to an embodiment of the present invention, there is provided a data recording apparatus writing data on/reading data from a hard disk drive in response to a data-write/read command received from an upper control device. The data recording apparatus includes a command-aggregating device and a command-issuing device. The command-aggregating device is configured to generate an aggregate command by aggregating contents of a plurality of commands under the conditions that the plurality of commands are of the same kind continuously received from the control device and logical block addresses designated by the plurality of commands are consecutive addresses. The command-issuing device is configured to issue the aggregate command generated by aggregating the plurality of commands to a hard disk drive controller that controls the hard disk drive.

According to another embodiment of the present invention, there is provided a method for internal control of a data recording apparatus writing data on/reading data from a hard disk drive in response to a data-write/read command received from an upper control device. The method includes:

generating an aggregate command by aggregating contents of a plurality of commands under the conditions that the plurality of commands are of the same kind continuously received from the control device and logical block addresses designated by the plurality of commands are consecutive addresses; and issuing the aggregate command generated by aggregating the plurality of commands to a hard disk drive controller that controls the hard disk drive.

According to the embodiments of the data recording apparatus and the method for internal control thereof, a command may not be issued to a hard disk drive controller immediately after receiving one command from an upper control device. According to the embodiments of the data recording apparatus and the method for internal control thereof, there is generated one aggregate command in which contents of a plurality of commands are aggregated under the conditions that the plurality of commands are of the same kind continuously received from the upper control device and logical addresses designated by the respective commands are consecutive addresses.

Subsequently, such a command in which the contents of the plurality of commands are aggregated is issued to the hard disk drive controller.

The upper control device may manage data in the data recording apparatus using a universal file system and transmit a write/read command to the data recording apparatus in response to a write/read request for a large data size received from an outside apparatus. In this case, such a write/read request is divided into a plurality of commands and then transmitted to the data recording apparatus. In general, these commands continuously received by the data recording apparatus are of the same kind and designate consecutive logical block addresses, respectively.

Therefore, in that case, only one command obtained by aggregating contents of a plurality of divided commands is issued to the hard disk drive controller. Thus, the number of commands issued to the hard disk drive controller corresponds to the number of the hard disk drives. In the related art, if the number of commands divided in the upper control device is defined as "N", then the number of issued commands is obtained by multiplying the number of the hard disk drives by "N". Thus, according to an embodiment of the present invention, the number of commands issued may be 1/N commands of the related art.

Therefore, it leads to reduce the overhead of the control part that carries out the internal control of the data recording apparatus when the hard disks thereof are managed using the universal file system.

Furthermore, according to the embodiments of the data recording apparatus or the method for the internal control thereof, for example, the contents of a plurality of commands may be aggregated under the further condition that the total number of sectors requested by the plurality of commands is not more than a predetermined maximum number of sectors.

Therefore, the number of sectors requested per command issued to the hard disk drive controller may not exceed the maximum sector number. Thus, write/read efficiency can be prevented from lowering due to issuing commands requesting an excessive number of sectors. In addition, data with an amount exceeding the capacity of a memory in the data recording apparatus, which is provided for temporarily storing data received together with a data-write command until a command is issued to the hard disk drive controller, is prevented from being written on the memory.

Furthermore, according to the embodiments of the data recording apparatus or the method for the internal control thereof, for example, the contents of a plurality of commands may be aggregated under the further condition that the plurality of commands are received within a predetermined time.

In this way, by only aggregating the contents of commands received within a predetermined time period, the time until a command corresponding to the received command is issued to the hard disk drive controller may not exceed a predetermined time. Thus, data may be recorded/reproduced in real time without a break.

According to further another embodiment of the present invention, there is provided a data recording system. The system includes a data recording apparatus and an upper control device. The upper control device transmits a data-write/read command to the data recording apparatus. The data recording apparatus writes data on/reads data from a hard disk drive in response to the data-write/read command received from the upper control device. The data recording apparatus includes a command-aggregating device and a command-issuing device. The command-aggregating device is configured to generate an aggregate command by aggregating contents of a plurality of commands under the conditions that the plurality of commands are of the same kind continuously received from the control device and logical block addresses designated by the plurality of commands are consecutive addresses. The command-issuing device is configured to issue the aggregate command generated by aggregating the plurality of commands to a hard disk drive controller that controls the hard disk drive.

The data recording system includes the data recording apparatus according to the embodiment of the present invention and an upper control device. Therefore, the overhead in the control part carrying out the internal control of the data recording apparatus can be reduced when the hard disk in the data recording apparatus is managed using a universal file system.

According to embodiments of the present invention, there is provided a data recording apparatus writing data on/reading data from a hard disk drive in response to a data-write/read command received from an upper control device. The overhead of a control part carrying out the internal control of the apparatus can be reduced when the hard disk in the data recording apparatus is managed using a universal file system.

DESCRIPTION OF THE PREFERRED EMBODIMENTS

Hereinafter, embodiments of the present invention will be described in detail with reference to the attached drawings. In the following description, a digital cinema screening system will be described as an embodiment of the present invention. First, the general configuration of the digital cinema screening system will be described.

Figure 1:
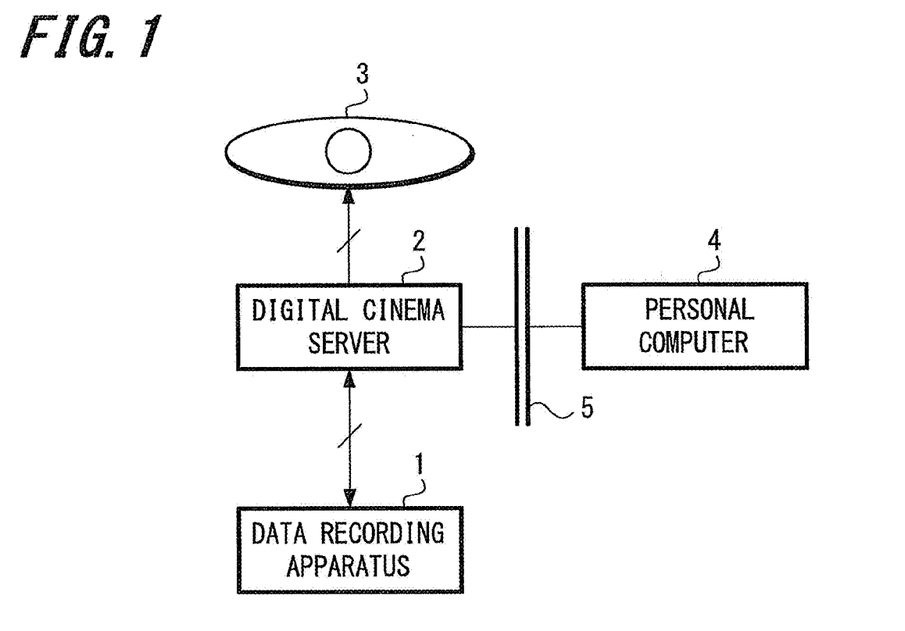
FIG. 1 is a schematic diagram illustrating the entire configuration of a digital cinema screening system in accordance with an embodiment of the present invention.

FIG. 1 is the general configuration of the digital cinema screening system in accordance with the embodiment of the present invention. The digital cinema screening system includes a data recording apparatus 1 using a RAID technology, a digital cinema server 2, a projector (projection-type display device) 3, and a personal computer 4.

A housing (not shown) houses the data recording apparatus 1, the digital cinema server 2, and the projector 3. The digital cinema server 2 is connected to the personal computer 4 via a high speed network (e.g., using such standard as 1000BASE-T)

The digital cinema screening system records AV (audio and/or video) data of a movie to be screened (the video data has been compressed by an image compression standard such as JPEG 2000) in advance on the data recording apparatus 1 from the personal computer 4 through the digital cinema server 2. Subsequently, the recording apparatus 1 reproduces the AV data and the digital cinema server 2 then supplies the AV data to the projector 3 to project the AV data on a screen.

The personal computer 4 stores programs for allowing the user to carry out recording AV data, screening a movie, and managing data other than AV data on a GUI screen. Here, the data other than AV data may include, for example, log information about the operation of the data recording apparatus 1, information about the file systems of AV data in the data recording apparatus 1, and movie caption data. Based on the user's operation on the GUI screen, a request for writing/reading AV data, a request for writing/reading log information, file system information, and caption data, or the like is transmitted from the personal computer 4 to the digital cinema server 2 via the high-sped network 5.

Figure 2:
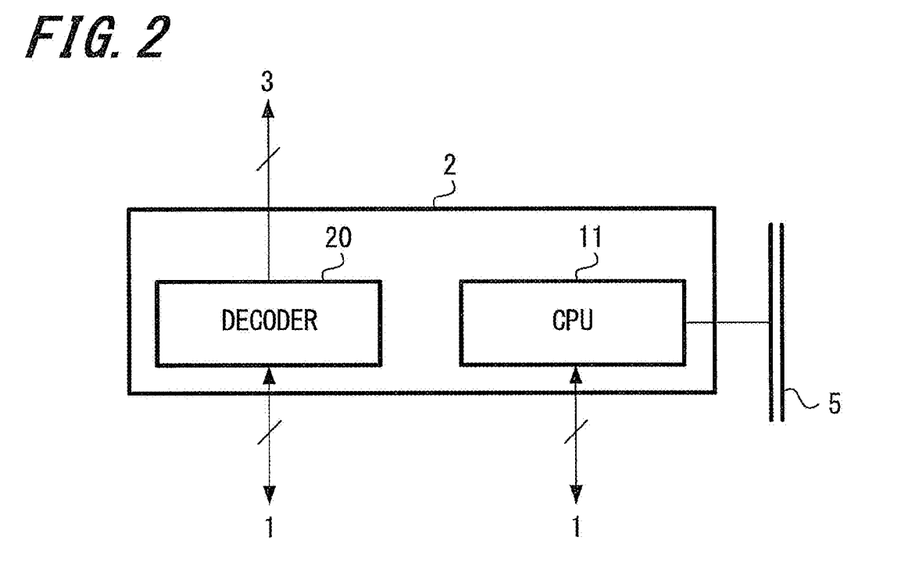
FIG. 2 is a diagram illustrating a circuit provided in the digital cinema server shown in FIG. 1.

FIG. 2 is a diagram illustrating main circuits in the digital cinema server 2. As shown in the figure, the digital cinema server 2 includes a CPU 11 and a decoder 20 for decompressing the compressed AV data. The CPU 11 is connected to the high-speed network 5 shown in FIG. 1 and connected to the data recording apparatus 1 shown in FIG. 1 via a PCI-X bus. The decoder 20 is connected to the data recording apparatus 1 and the projector 3 shown in FIG. 1.

A universal operating system (OS), such as Linux, runs on the CPU 11. Thus, the CPU 11 manages hard disks in the data recording apparatus 1 using a universal file system, such as XFS, on the OS. The CPU 11 stores the following three programs (a) to (c), which run on the universal OS:

(a) "internal-control application", an internal-control program for the data recording apparatus 1;

(b) "digital cinema application", a program for transmitting an AV data write/read command to the "internal-control application" in response to an AV data write/read request received from the personal computer 4; and (c) "management application", a program for transmitting write/read commands for log information, file system information, and caption data to the "internal-control application" in response to requests therefor received from the personal computer 4.

Here, an AV data write/read command transmitted from the personal computer 4 to the CPU 11 may request AV data having a much larger amount of data than that of other data (including the log information, file system information, and caption data). Therefore, the data size (the number of sectors requested) per AV data write/read request may be extremely large in comparison with a small data size per request for writing/reading log information, file system information, or caption data.

Figure 3:
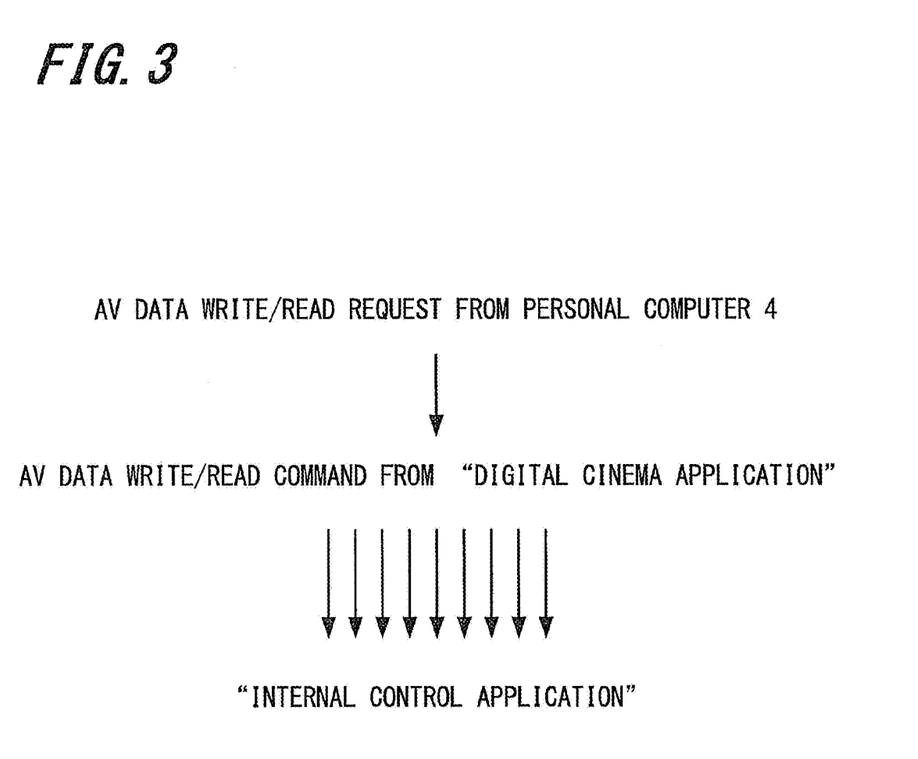
FIG. 3 is a schematic diagram illustrating the manner of dividing an AV data write/read request into a plurality of commands, using a universal file system.

The CPU 11 manages hard disks in the data recording apparatus 1 using the universal file system on the universal OS. Thus, if the CPU 11 receives from the personal computer 4 a request for writing/reading AV data with a large data size, the universal file system divides the write/read request into a large number of commands with small data sizes as schematically illustrated in FIG. 3. It is due to a small memory unit managed by the universal OS. Therefore, as schematically illustrated in FIG. 3, the "internal-control application" receives a large number of write/read commands with small data sizes each time the AV data write/read request is transmitted from the personal computer 4.

Furthermore, the CPU 11 functions as an upper control device of the digital recording apparatus 1 by executing the "digital cinema application" or the "management application". Here, the upper control device is one transmitting a data-write/read command to the data recording apparatus 1. In addition, the CPU 11 also has a function of carrying out the internal control of the recording apparatus 1 by executing the "internal-control application".

Hereinafter, for clear explanations, the CPU 11 will be divided into two parts in terms of functions. One part of the CPU 11 configured to function as an upper control device in the CPU 11 is referred to as an upper control part 11-1. The other part of the CPU 11 configured to carry out the internal control of the data recording apparatus 1 is referred to as an internal control part 11-2.

Figure 4:
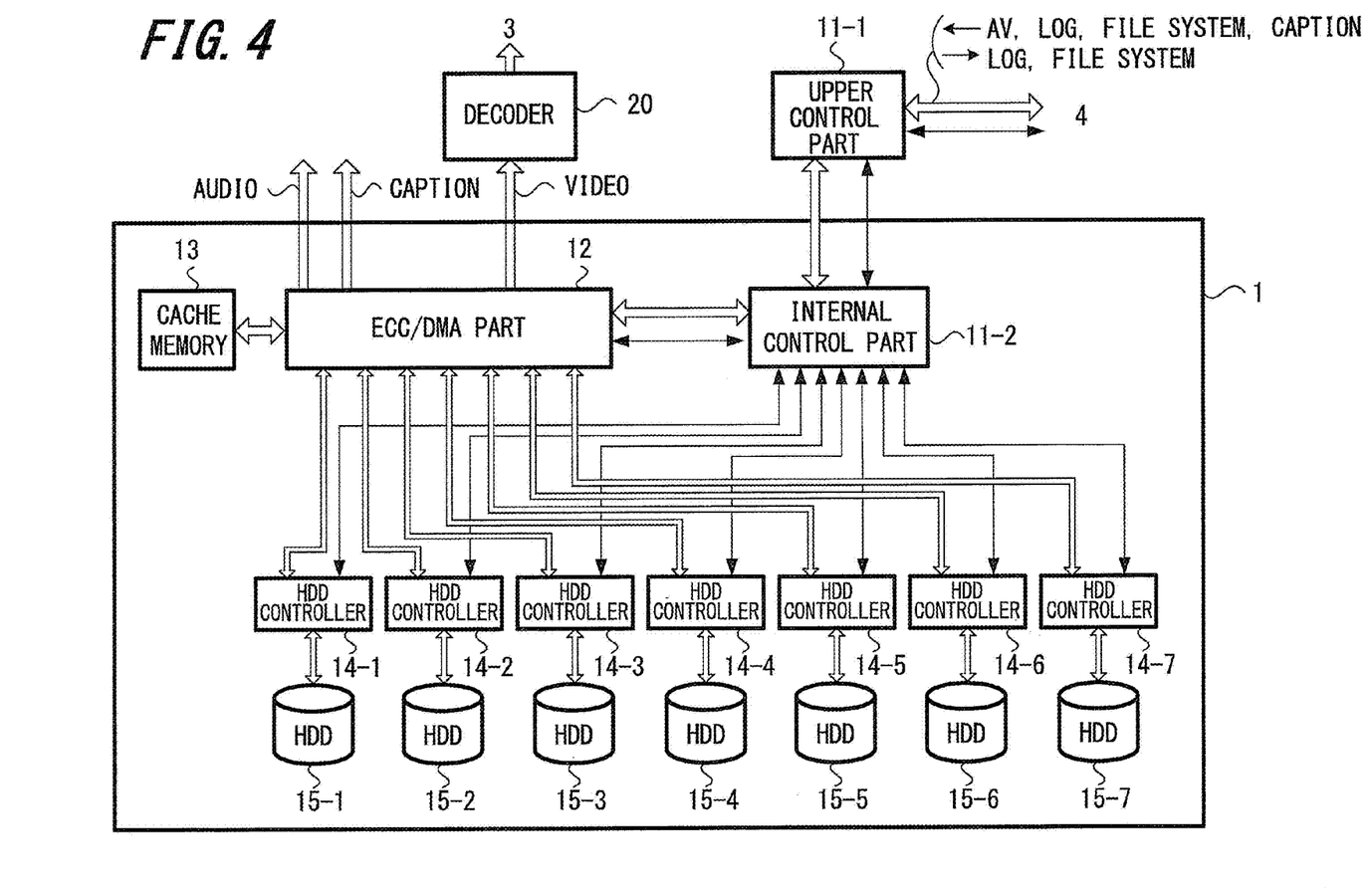
FIG. 4 is a block diagram illustrating the configuration of the data recording apparatus shown in FIG. 1.

FIG. 4 illustrates the configuration of the data recording apparatus 1 with the upper control part 11-1, the internal control part 11-2, and a decoder 20. Here, the figure illustrates the internal control part 11-2 as a part of the data recording apparatus 1 because of its function. Double-lined arrows represent the flows of data (e.g., AV data, log information, file system information, and caption data), respectively. Single-lined arrows represent the flows of commands transmitted and received by the upper control part 11-1 and the internal control part 11-2 and the responses therefrom, respectively.

The data recording apparatus 1 includes an ECC/DMA part 12 including a field programmable gate array (FPGA), a cache memory 13, seven hard disk drives (HDDs) 15 (15-1 to 15-7), and HDD controllers (e.g., SAS controllers) 14 (14-1 to 14-7) controlling the HDDs. Among the seven HDDs 15 (15-1 to 15-7), four HDDs 15-1 to 15-4 are provided for data storage, two HDDs 15-5 to 15-6 are provided for error correction, and the remaining one HDD 15-7 is provided for spare or backup.

When recording is carried out, the ECC/DMA part 12 generates an error-correction code based on the data sent from the upper control part 11-1 in the digital cinema server 2. The data with the error-correction code is stripped and then fed into the HDDs 15-1 to 15-6 via the HDD controllers 14-1 to 14-6, respectively.

When reproduction is carried out, the ECC/DMA part 12 uses the cache memory 13 to destripe data received from HDDs 15-1 to 15-6 through the HDD controllers 14-1 to 14-6 and the destripped data is then subjected to error correction, thereby reconfiguring the data to its original state.

During the reproduction of video data, data reconfigured at the ECC/DMA part 12 is sent to the decoder 20. The baseband video data decompressed by the decoder 20 is sent to the projector 3 shown in FIG. 1 and then displayed on a screen from the projector 3.

During the reproduction of audio data, data reconfigured at the ECC/DMA part 12 is output from an audio output terminal (not shown) provided to a housing, to the outside thereof. The data recording apparatus 1, the digital cinema server 2, and the projector 3 are housed in the housing.

During the reproduction of log information and file system information, the information data reconfigured at the ECC/DMA part 12 are supplied to the upper control part 11-1 and then transmitted from the upper control part 11-1 to the personal computer 4 as shown in FIG. 1. Subsequently, such information is displayed on a GUI screen in the display of the personal computer 4.

During the reproduction of caption data, the data reconfigured at the ECC/DMA part 12 is transmitted to a mixing circuit (not shown) in the digital cinema server 2 and then combined with the baseband video data decompressed by the decoder 20.

Figure 5:
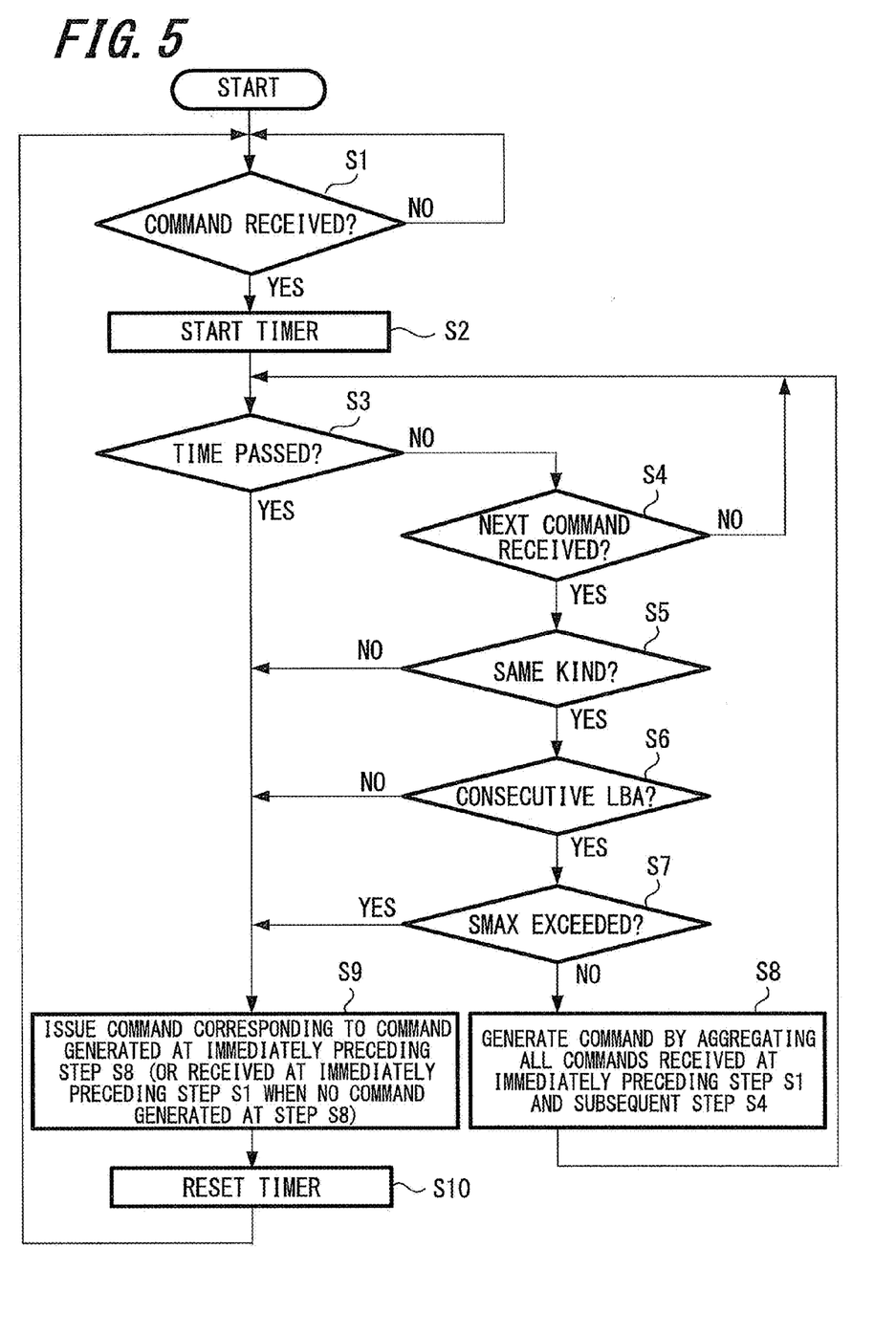
FIG. 5 is a flow chart representing command aggregating processing executed by an internal control part shown in FIG. 4.

The internal control part 11-2 executes the "internal-control application" as described above to control both the ECC/DMA part 12 and the HDD controllers 14. Here, FIG. 5 illustrates the flowchart of command aggregating processing, which is a part of the processing carried out by the "internal-control application".

First, the internal control part 11-2 is kept in a standby mode until it receives one command from the upper control part 11-1 (Step S1). If it receives one command, then a timer (installed in the CPU 11 shown in FIG. 2) is set (Step S2).

Subsequently, the timer started at the immediately preceding step (step S2) is used for determining whether a previously defined time limit T is over (Step S3). The setting value of the time limit T may be determined considering the continuous recording of AV data or the continuous reproduction of AV data for a movie displayed on a screen.

If it is "No" in step S3, then whether a subsequent command is newly received or not is determined (Step s4). If it is "No" in step S4, then the processing returns to step S3.

If it becomes "Yes" in step S4, then whether two commands, a command received in the present step S4 and a command received in the immediately preceding step are of the same kind is determined (whether they have the same kind of data and two of them are write commands or read commands) (Step S5). Here, the command received in the immediately preceding step may be one received in the immediately preceding step S1 when the processing proceeds to step S4 for the first time. Alternatively, it may be the command received in the immediately preceding step S4 when the processing proceeds to step S4 for the second time or more.

If it is "Yes" in step S5, whether logical block addresses (LBAs) specified by these two commands are continuous is determined (Step S6).

If it is "Yes" in step S6, then whether the total number of sectors requested by the command received in the immediately preceding step S1 and all the commands received in the subsequent step 4 exceeds the predetermined maximum number of sectors Smax is determined (Step S7). The setting value of the maximum sector number Smax may be determined considering the following two points:

One is to prevent a decrease in write/read efficiency due to an excessive number of sectors requested per command issued to the ECC/DMA part 12 and the HDD controllers 14-1 to 14-6.

The other is to prevent writing an excessive volume of data to the cache memory 13 over the capacity thereof. Here, data is written in the cache memory 13 until commands are issued to the ECC/DMA part 12 and the HDD controllers 14-1 to 14-6 when receiving a data-writing command.

If it is "No" in step S7, then a command obtained by aggregating contents of the command received in the immediately preceding step S1 and all the commands received in the subsequent step S4 is generated (Step S8), followed by returning to step S3.

If it is "Yes" in step S3, "No" in step S5 or S6, or "Yes" in step S7, then commands are issued to the ECC/DMA part 12 and the HDD controllers 14-1 to 14-6 (Step S9). Here, the commands correspond to those generated in the immediately preceding step S8 (or those received in the immediately preceding step S1 when the processing has not proceeded to the step S8) subsequent to receiving commands in the immediately preceding step S1. Subsequently, the timer is reset (Step S10) and the processing returns to the step S1.

As described above, if the upper control part 11-1 allows the "digital cinema application" to transmit AV data write/read commands to the internal control part 11-2, a request for writing/reading AV data from the personal computer 4 with comparatively large data size is divided into a plurality of commands. Subsequently, these commands are transmitted to the internal control part 11-2. Thus, these commands continuously received by the internal control part 11-2 are those of the same kind and generally designate consecutive logical block addresses.

Figure 6:
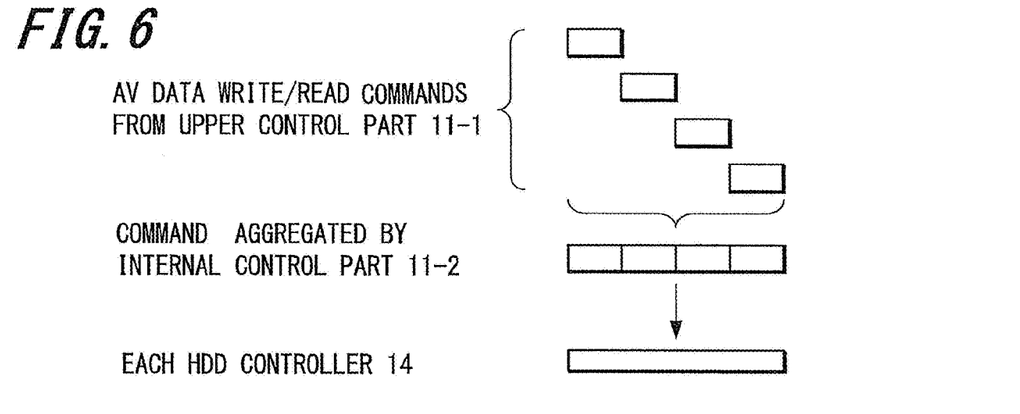
FIG. 6 is a schematic diagram illustrating the manner of aggregating AV data write/read commands by the command aggregating processing shown in FIG. 5.

Therefore, if the AV data write/read commands are transmitted from the upper control part 11-1, then aggregating occurs until it becomes "Yes" in step S3 or step S7 in the command aggregating processing shown in FIG. 5 (until passing the time limit T or exceeding the maximum sector number Smax). That is, the internal control part 11-2 aggregates contents of the AV data write/read commands from the upper control part 11-1 into one command as schematically illustrated in FIG. 6. Here, the write/read commands are a large number of divided commands supplied from the upper control part 11-1. Subsequently, commands corresponding to the aggregated command are issued to the respective HDD controllers 14-1 to 14-6 and then executed therein.

In this way, if a command is divided into "N" commands in the upper control part 11-1, then the number of commands issued from the internal control part 11-2 may be one Nth compared to the related art. The overhead of the internal control part 11-2 carrying out the internal control of the data recording apparatus 1 can be reduced while managing the hard disks therein using the universal file system.

Figure 7A:
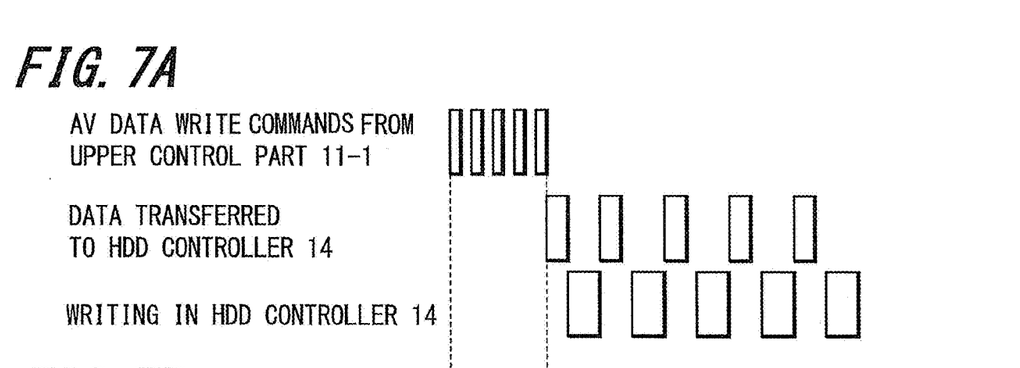
FIGS. 7A and 7B are schematic diagrams illustrating the manner of aggregating commands to reduce the write-processing time.
Figure 7B:
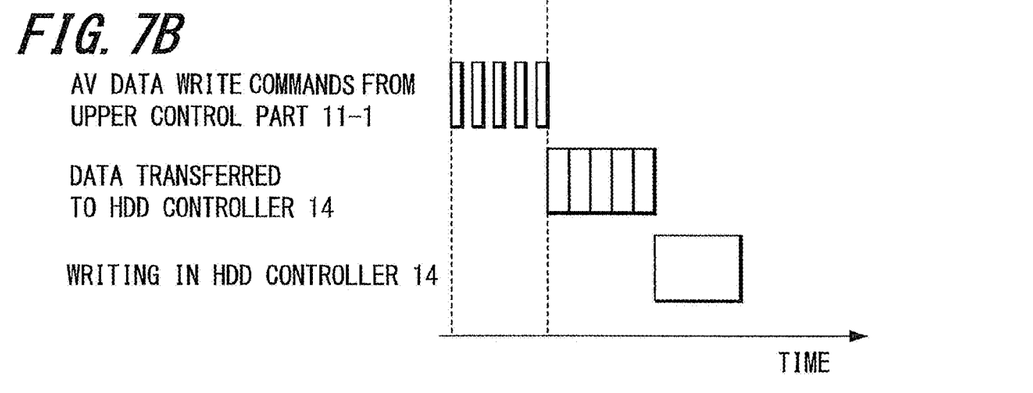

In this way, furthermore, the number of commands executed by the respective HDD controllers 14-1 to 14-6 can be reduced by aggregating the contents of the commands. Thus, the throughput of writing/reading AV data can be substantially improved. When writing AV data, as shown in FIGS. 7A and 7B that are schematic diagrams, the write-processing times in the respective HDD controllers 14-1 to 14-6 when issuing the aggregated commands (FIG. 7B) are shortened in comparison with the write-processing times in the respective HDD controllers 14-1 to 14-6 without aggregating the contents of commands (FIG. 7A).

The aggregated command allows the internal control part 11-2 to reduce its overhead, thereby shortening the write-processing time. In addition, the write-processing time can also be shortened by reducing the number of times that the HDD controllers 14-1 to 14-6 wait for rotational latency with respect to the desired sectors. Therefore, the throughput of writing AV data can be improved greatly.

Furthermore, when aggregating contents of a plurality of commands, the command aggregating processing is carried out under the condition that the plurality of commands are received within a predetermined time limit T (Step S3 in FIG. 5). Thus, real-time screening of a movie can be carried out by continuous reproduction of AV data or real-time recording of AV data can be carried out without a break.

Furthermore, when aggregating contents of a plurality of commands, the command aggregating processing is carried out under the condition that the total number of sectors requested by the plurality of commands is not more than the maximum number of sectors Smax (Step S7 in FIG. 5). Thus, it becomes possible to avoid a decrease in write/read efficiency due to an excessive number of sectors requested per command issued to the ECC/DMA part 12 and HDD controllers 14-1 to 14-6 and to prevent the data exceeding the volume of the cache memory 13 from being written therein.

Figure 8:
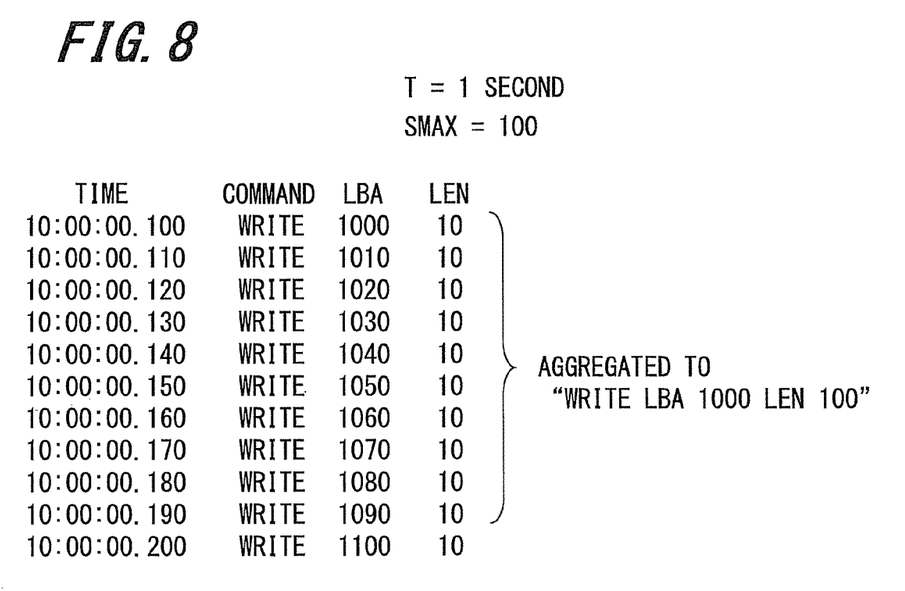
FIG. 8 is a diagram illustrating a specific example of the aggregating of commands.
Figure 9:
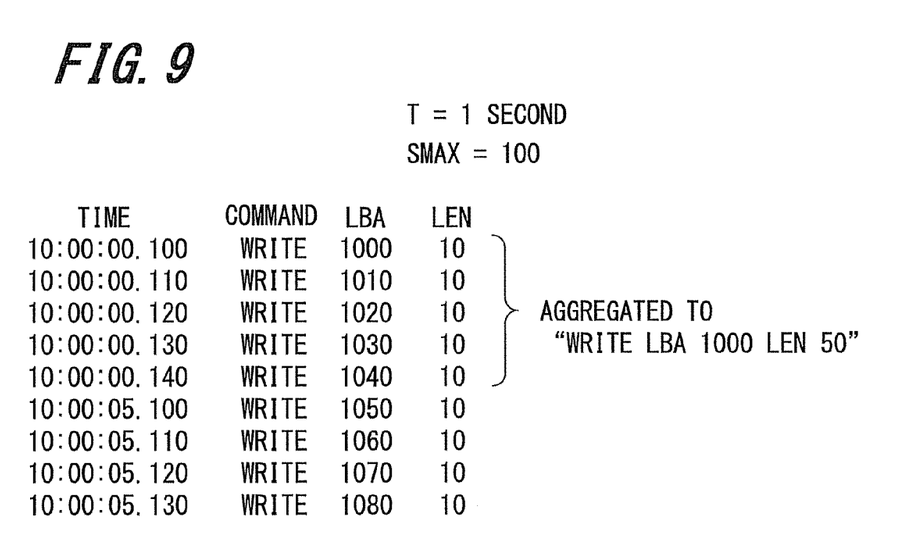
FIG. 9 is a diagram illustrating another specific example of the aggregating of commands.
Figure 10:
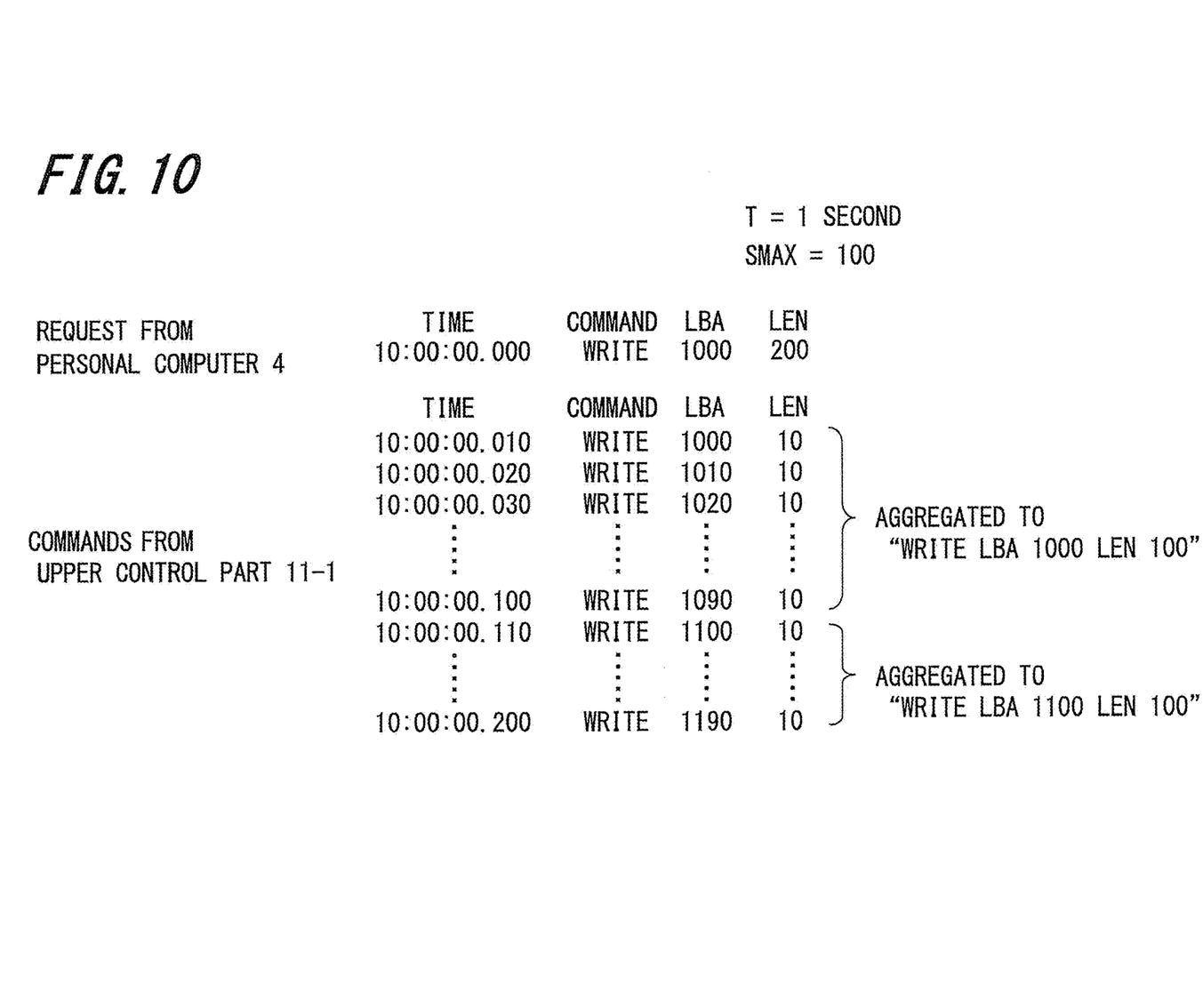
FIG. 10 is a diagram illustrating a still another specific example of the aggregating of commands.

FIGS. 8 to 10 are specific examples of the commands aggregated by the command aggregating processing, respectively. In these examples, the time limit T is set to one second and the maximum sector number Smax is set to 100. Note, however, that these values T and Smax are examples for explanation purpose only. Thus, these values may be set in view of the real-time recording/reproduction and the write/read efficiency as described above.

In the example shown in FIG. 8, eleven write commands (the same kind of data) are received at a time period from 10:00:00.100 to 10:00:00.200. These eleven write commands specify logic block addresses (LBAs) with a value of 10 displaced from each other, while the length (LEN) of each LBA corresponding to the number of request sectors is 10. Thus, the LBAs are consecutive.

However, the total number of request sectors reaches the maximum sector number Smax=100 by the tenth write command. Thus, the first to tenth write commands can be aggregated to one command "WRITE LBA1000 LEN100".

In the example shown in FIG. 9, five write commands (the same kind of data) are received at a time period from 10:00:00.100 to 10:00:00.140 and four write commands (the same kind of data as that of the aforementioned five write commands) are then received after an interval, or at a time period from 10:00:05.100 to 10:00:05.130. These eleven write commands specify logic block addresses (LBAs) with a value of 10 displaced from each other, while the length (LEN) of each LBA corresponding to the number of request sectors is 10. Thus, the LBAs are consecutive.

However, the time limit T=1 second has passed when the sixth write command is received. Thus, the first to fifth write commands can be aggregated to one command, "WRITE LBA1000 LEN50".

In the example shown in FIG. 10, the manner of dividing the request from the personal computer 4 is also illustrated. The upper control part 11-1 receives a request for writing AV data from the personal computer 4 at time 10:00:00.000. This write request specifies LBA1000. In addition, LEN (the number or request sectors) is 200.

The upper control part 11-1 divides such a write request into twenty commands each having LEN=10. The internal control part 11-2 receives these twenty commands at a time from 10:00:00.010 to 10:00:00.200.

Up to the 10th write command among them, the total number of request sectors reaches the maximum sector number Smax=100 (also the time limit T reaches one second). Thus, the first to tenth write commands are aggregated to one command, "WRITE LBA1000 LEN100".

In addition, the 11th to 20th write commands allows the total number of request sectors to reach the maximum sector number Smax=100 (also the time limit T reaches one second). Thus, the 11th to 20th write commands are aggregated to another command, "WRITE LBA1100 LEN100".

In the above-described embodiment, a single CPU 11 in the digital cinema server 2 functions as the upper control device of the data recording apparatus 1 and as the device carrying out the internal control of the data recording apparatus 1. In an alternative example, the CPU 11 in the digital cinema server 2 may have only a function as an upper control device of the data recording apparatus 1 (may execute only a "digital cinema application" and a "management application"). In addition, another CPU dedicated to carry out the internal control of the data recording apparatus 1 (execute the "internal-control application") may be installed within the data recording apparatus 1.

Furthermore, a digital cinema screening system is described as an embodiment of the present invention. Alternatively, the present invention may be applied to any data recording apparatus writing data on/reading data from a hard disk drive in response to a command supplied from an upper control device, where a hard disk can be managed using a universal file system.

It should be understood by those skilled in the art that various modifications, combinations, sub-combinations and alterations may occur depending on design requirements and other factors insofar as they are within the scope of the appended claims or the equivalents thereof.

What is claimed is:

1. A data recording apparatus writing data on or reading data from a hard disk drive in response to a data-write/read command received from an upper control device, the apparatus comprising:
   command-aggregating means for generating an aggregate command by aggregating contents of a plurality of commands under conditions that the plurality of commands are of a same kind continuously received from the upper control device and logical block addresses designated by the plurality of commands are consecutive addresses; and
   command-issuing means for issuing the aggregate command generated by aggregating the plurality of commands to a hard disk drive controller that controls the hard disk drive;
   wherein the command-aggregating means further aggregates commands under a condition that a total number of sectors requested by the plurality of commands is not more than a predetermined maximum number of sectors.

2. The data recording apparatus according to claim 1, wherein the command-aggregating means further aggregates commands under the condition that the plurality of commands are received within a predetermined time.

3. The data recording apparatus according to claim 1, wherein
   a RAID (Redundant Array of Inexpensive Disks) controller controls a plurality of hard disk drives provided as the hard disk drive, and
   the command-issuing means issues the aggregate command to the RAID controller.

4. The data recording apparatus according to claim 1, wherein
   write/read commands for video data and/or audio data are received from the upper control device.

5. A method for internal control of a data recording apparatus writing data on or reading data from a hard disk drive in response to a data-write/read command received from an upper control device, comprising:
   generating an aggregate command by aggregating contents of a plurality of commands under conditions that the plurality of commands are of a same kind continuously received from the upper control device and logical block addresses designated by the plurality of commands are consecutive addresses; and
   issuing the aggregate command generated by aggregating the plurality of commands to a hard disk drive controller that controls the hard disk drive,
   wherein the aggregate command is further generated under a condition that a total number of sectors requested by the plurality of commands is not more than a predetermined maximum number of sectors.

6. The method according to claim 5, wherein
   the aggregate command is further generated under the condition that the plurality of commands are received within a predetermined time.

7. The method according to claim 5, wherein
   a RAID (Redundant Array of Inexpensive Disks) controller controls a plurality of hard disk drives provided as the hard disk drive, and
   the aggregate command is issued to the RAID controller.

8. A data recording system, comprising:
   a data recording apparatus writing data on or reading data from a hard disk drive in response to a received data-write/read command; and
   an upper control device transmitting the data-write/read command to the data recording apparatus,
   wherein the data recording apparatus includes
   command-aggregating means for generating an aggregate command by aggregating contents of a plurality of commands under conditions that the plurality of commands are of a same kind continuously received from the upper control device and logical block addresses designated by the plurality of commands are consecutive addresses; and command-issuing means for issuing the aggregate command generated by aggregating the plurality of commands to a hard disk drive controller that controls the hard disk drive, wherein the command-aggregating means in the data recording apparatus further aggregates commands under the condition that a total number of sectors requested by the plurality of commands is not more than a predetermined maximum number of sectors.

9. The data recording system according to claim 8, wherein the command-aggregating means in the data recording apparatus further aggregates commands under the condition that the plurality of commands are received within a predetermined time.

10. The data recording system according to claim 8, wherein
the data recording apparatus includes a RAID (Redundant Array of Inexpensive Disks) controller that controls a plurality of hard disk drives provided as the hard disk drive, and
the command-issuing means in the data recording apparatus issues the aggregate command to the RAID controller.

11. The data recording system according to claim 8, wherein
the control device manages data in the data recording apparatus using a universal file system and transmits a write/read command in response to a data-write/read request received from an outside apparatus.

12. The data recording system according to claim 8, wherein
the control device transmits write/read commands for video data and/or audio data.

* * * * *